UNITED STATES PATENT OFFICE 2,119,860

EXPANDED CEMENT PROCESS

Albert Henderson, Pittsburgh, Pa., assignor to William P. Witherow, Pittsburgh, Pa.

No Drawing. Application March 4, 1936, Serial No. 67,095

1 Claim. (Cl. 18—47.5)

This invention pertains to a process of making expanded or cellular cement articles wherein the breakage from shrinkage in the articles is avoided.

Expanded cement articles are made by mixing, while dry, Portland or Lumnite cement with or without aggregates and an expanding agent, such as, aluminum powder. To this mix is added water which causes the aluminum powder to react with the alkalis in the mix. This hydrated mix is poured into a mold and allowed to expand. After the mix has expanded and when set, it is sawed into articles, such as insulating brick, partitions, back-ups, or planks for building purposes. Expanded cement sets in a few hours but the material is too fragile to be cut without much damage to the corners of the products, so I cut or subdivide the mix when it is cured. This takes place several hours after the mix sets.

Much breakage results from the present practice, due to the fact that the chemical reactions of the gas-forming agent generate great heat, and as heat quickly radiates at the surface of the expanded mass, the interior of the mass is considerably hotter than the areas at the surface. Expanded cement shrinks during the setting period, and this setting is hastened by heat. Therefore, the mass sets up faster in the interior than in the exterior areas, resulting in uneven setting and shrinkage. This causes great internal stresses throughout the hardened mass, and when the mass is sawed, many articles are found to be broken, as the comparatively fragile cellular structure is not strong enough to resist the stresses caused by uneven shrinkage.

Furthermore, expanded cement shrinks during curing when the surplus water contained therein evaporates, and as the evaporation takes place faster near the surface, additional stresses are set up within the mass.

To overcome the above, I subject the mass to a heated atmosphere, so that there is no loss of heat through radiation. This causes the mass to set up evenly and avoids uneven shrinkage, and results in the elimination of breakage when the mass is subdivided while hot. I also subject the mass to a moist atmosphere so that there is no loss of moisture in the mass. Then while the mass is still hot, I subdivide it. Sawing the expanded mass when cured and hot overcomes the present difficulty in making expanded cement articles without the considerable breakage incident to present practice. The articles being of small volume, any strain set up through further hardening or evaporation of moisture is too small to cause any damage.

By subjecting the expanded mix during the setting and curing period to heat and moisture, then subdividing the cured expanded mass into articles while the mass is still hot and before it cools off, I overcome the present losses from breakage.

I claim as my invention:

In a method of making articles of expanded cement, the steps including pouring into a mould an expanding cement mix which generates heat in setting, supplying heat externally to the poured mass to equalize the heat generated therein and prevent non-uniform shrinkage thereof, and, before substantial cooling of the mass, removing the mass from the mould and subdividing it into pieces so small that the internal stresses created therein by subsequent hardening or evaporation are insufficient to damage the pieces, as by causing cracks therein.

ALBERT HENDERSON.